United States Patent [19]

Krempl

[11] 4,169,387

[45] Oct. 2, 1979

[54] TRANSDUCER FOR MECHANICAL MEASURED VARIABLES, ESPECIALLY A PRESSURE TRANSDUCER

[75] Inventor: Peter Krempl, Vienna, Austria

[73] Assignee: Hans List, Graz, Austria

[21] Appl. No.: 857,414

[22] Filed: Dec. 5, 1977

[30] Foreign Application Priority Data

Dec. 7, 1976 [AT] Austria .................................. 9073

[51] Int. Cl.² ........................................... G01L 7/00
[52] U.S. Cl. ..................................... 73/708; 73/115; 73/497; 165/105
[58] Field of Search ...................... 73/708, 115, 497; 165/105

[56] References Cited

U.S. PATENT DOCUMENTS

| | | | |
|---|---|---|---|
| 2,917,642 | 12/1959 | Wright et al. | 73/115 |
| 3,505,862 | 4/1970 | List et al. | 73/115 |
| 3,714,981 | 2/1973 | Noren | 165/105 |
| 3,811,493 | 5/1974 | Bilinski et al. | 165/105 |
| 3,838,668 | 10/1974 | Hays et al. | 165/105 |

*Primary Examiner*—Donald O. Woodiel
*Attorney, Agent, or Firm*—Watson, Cole, Grindle & Watson

[57] ABSTRACT

A transducer for mechanical measured variables, especially a pressure transducer, having a heat pipe system within the housing, the heat pipe system is connected on one side to the thermally high stressed parts of the transducer, and on the other side to parts not exposed to heat or cold. The sensor element of the transducer is cooled through heat transport by means of an alternatively vaporizing and condensating working fluid within the heat pipe system.

13 Claims, 14 Drawing Figures

TRANSDUCER FOR MECHANICAL MEASURED VARIABLES, ESPECIALLY A PRESSURE TRANSDUCER

BACKGROUND OF THE INVENTION

1. Field of the Invention

The invention relates to tranducers for mechanical measured variables, and more particularly pressure transducers.

2. Description of the Prior Art

Transducers, especially for measurements in internal combustion engines, normally are either provided with a cooling device or they are constructed in a manner to resist high temperature loads, so that a cooling device is not necessary. In cooling systems heat transport is usually transformed by means of the forced flow of a fluid or air.

It is a disadvantage of the known, cooled transducers to require external equipment for the cooling device. Transducers without a cooling system are exposed to high thermal stress or one said thereof. Due to the limited thermal conductivity of the usable materials a part of the transducer is disproportinately heated and therefore problems appear because of the selection of suitable materials and sensors (e.g. piezoelectric crystals, strain gauges, piezo resonators). The resulting temperature gradient is variable with time and inhomogeneously distributed over the sensor element. These undefined temperature conditions make it difficult to compensate the thermal sources of error, which occur in consequence of the variable expansion and the temperature dependence of the physical properties of the sensor.

SUMMARY OF THE INVENTION

The invention rests on the idea that the aforesaid disadvantages can be eliminated using a closed loop heat transport system based on the per se known heat pipe principle. The function of a heat pipe is based on the vaporization and condensation of a working fluid in a closed receptacle, the walls of which are lined with a suitable wick material. When heating the receptacle at one point the working fluid vaporizes and latent heat in a vapor phase is transported to an insignificantly cooler point of the receptacle where the heat is delivered by way of condensation. The fluid is recycled by the capillary action of the wick material.

The invention consists in the arrangement of a heat pipe system, preferably within the housing of the transducer, with the heat pipe system being well heat conductingly connected on one side to the thermally high stressed parts, for instance the sensor element, and on the other side to parts not exposed to heat or coldness. The heat pipe system consists of at least one self-contained receptacle, the walls of which are lined at least partially with wick material. The wick is wetted from a working fluid and distributes the working fluid by capillary action. The working fluid circulates through the capillaries of the wick and the vapor of the working fluid circulates through the remaining hollow space forming a closed loop. Heat transfer takes place convect latent heat in the vapor phase of the fluid and improve the temperature balance along the hollow space.

Because of the convection of latent heat connected with mass transport a heat transfer is gained which is some orders of magnitude (powers of ten) higher than even the heat transport reachable with metallic heat conductors. The temperature gradient along a correctly dimensioned heat pipe amounts only to a few degrees Celsius. The temperature values are presettable by suitable selection of the operating parameters. Additionally, the positive temperature coefficient of the thermal conductivity of a heat pipe favors temperature stabilizing.

When dimensioning the heat pipe system consideration has to be given to the fact that it would work satisfactory only within a distinct temperature range and that temperature stabilization succeeds only by way of the temperature independent thermal conductivity. Therefore care must be taken on the one hand for a satisfactory heat supply to the transducer to reach the boiling point of the working fluid, and on the other hand to supply sufficient cooling to avoid overheating of the heat pipe system.

According to another embodiment of the invention the heat pipe system includes, in addition to the fluid and gaseous phase of the working fluid, other gases which do not condense at the working temperature of the system. These additional buffer gases are displaced by the vapor flow from the vaporization section to the condensation section of the heat pipe system. The increase of vapor pressure, caused by the increase of temperature, effects a further displacement of the buffer gas so that the transitory region of vapor to fluid is enlarged in the cooled condensation section. Therefore an amplification of the temperature dependence of the thermal conductivity is obtained by which a significantly improved temperature stabilization is gained.

In accordance with a further feature of the invention the heat pipe system may be well heat conductingly connected to a heat exchanger, for instance cooling fins. A more rapid dissipation of the applied heat is reached so that it is possible to combine the advantages of the known cooled transducers with that of the uncooled types. In the most simple case the heat exchanger may consist of cooling fins which perform an improved heat transfer for the surrounding air.

According to another embodiment of the invention the the heat pipe system may be arranged within the housing of the transducer between the outer surface of the housing and the sensor element. By these means a very compact transducer with optimum cooling of the sensor element is attained. Further advantages are obtained with a transducer having a clamping sleeve, axially symmetrically surrounding and straining the sensor element, the heat pipe system being arranged between the surface of the housing and the clamping sleeve. During operation the heat transport takes place in the direction of the axis of the clamping sleeve. This embodiment enables a simple heat transfer, especially in connection with a heat exchanger.

It also can be very advantageous if the space between the housing and the clamping sleeve is itself a part of the heat pipe system, with the heat pipe system being terminated against the pressure side by means of a membrane, because then a very simple construction is possible.

For a still higher intensity of heat transfer and closer to the sensor element according to a further embodiment of the invention, a second heat pipe system may be provided, being equally built up like the first one and being arranged between the sensor element and the first heat pipe system in a good thermal conductive manner. The second heat pipe system is run at a higher temperature than the first one. This enables effective operation at various temperatures and is very advantageous when heat attack occurs at a very small surface, e.g. at the membrane, and danger of drying of the wick material arises. By interposing a heat pipe with higher working temperature the heat exposed surface of the normal heat pipe may be essentially enlarged.

It is also an advantage to supply a second heat pipe system equally built up like, and being arranged parallel to, the first one and further being run at a working temperature different from that of the first heat pipe system. This is most advantageous when heat supply during operation is very uneven and falls below or exceeds the optimum operation range. By selecting suitable operation ranges of the parallel heat pipes an enlargement of the over all operation range is gained.

A further improvement of the invention is the arrangement of an annular space, filled with a fluid having good thermal conductivity, between the pressure end of the transducer and the heat pipe system. This embodiment ensures that pressure variation within the heat pipe is not transmitted to the membrane. Moreover, with a damaged membrane, escape of working fluid into the combustion chamber is prevented. The heat pipe system remains fully operable even with a damaged membrane and more freedom with respect to the selection of the working fluid is obtained. An additional improvement of heat transfer to the heat pipe system is gained when, according to a further feature of the invention, an elongation of the annular space in the axial direction of the transducer between the clamping sleeve and the heat pipe is provided.

According to another embodiment, the hollow spaces surround the sensor element are filled at least in part and at least partially with wick material, the working fluid circulating between the sensor element and the place of temperature attack. By these means the sensor element receives higher protection because of the interruption of the heat flow from the surface of heat attack to the sensor element.

According to a further embodiment of the invention the transducer is constructed as an acceleration transducer, the sensor element and the seismic mass being surrounded by a clamping sleeve, with at least one heat pipe system being provided and the system surrounding the clamping sleeve. A vaporization section of the heat pipe system is arranged approximately perpendicular to the axis and between the sensor element and the mounting surface of the transducer. A condensation section of the heat pipe system is arranged approximately parallel to the vaporization section at the other end of the transducer, both of the aforesaid sections being connected by two axially directed bores to form an annular duct. This construction avoids heat transfer by the heat pipe system from the mounting surface to the sensor element. Nevertheless good transmission of acceleration is provided. According to a preferred form of construction the condensator section is arranged within a block of good thermal conductive material, for instance copper.

DESCRIPTION OF THE DRAWINGS

The invention will be hereinafter more specifically explained with reference to exemplary embodiments depicted in the accompanying drawings, wherein.

DESCRIPTION OF THE PREFERRED EMBODIMENTS

Figure 1:
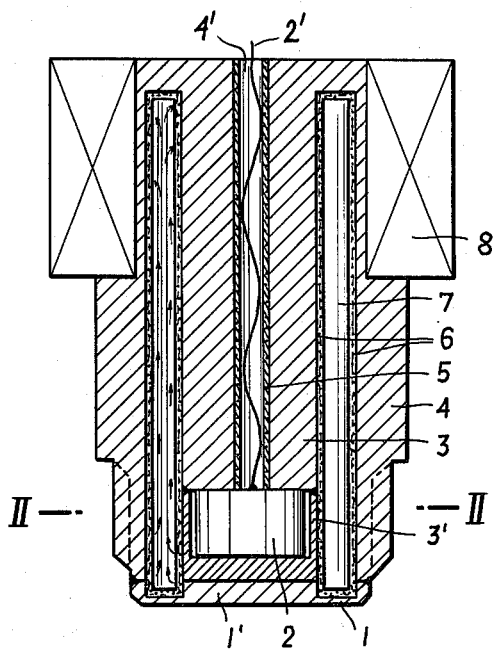
FIG. 1 is an example of a pressure transducer for internal combustion engines.

The sensor element 2 is surrounded by the clamping sleeve 3' and the abutment 3. The electrical connection is symbolically indicated by wire 2' which is carried by guide bore 4' and insulated against the housing 4 of the transducer by an insulating layer 5. Pressure transmission succeeds over plate 1' being connected to the housing 4 by means of membrane 1. The hollow space 7 between membrane 1, abutment 3 and housing 4 is sealed against the outside and encircles cylindrically the inner parts of the transducer. The walls of the hollow space 7 are lined with wick material 6, e.g. metallic gauze, porous sintered material, glass fiber or other fibrous material.

In the case of a simple two-phase heat pipe system the wick material 6 is wetted with a working fluid, e.g. water, ammoniac, acetone, mercury or sodium and the hollow space 7 is filled with the vapor phase of the fluid. When the transducer is heated on the membrane side the working fluid vaporizes in the adjacent wick material 6 and a circulation begins, shown in FIG. 1 by the arrows. The upper part of the heat pipe system borders on a heat exchanger 8 (in the simplest case the heat exchanger consists of a unit of cooling fins), and there the vapor condensates and the working fluid returns along the wick material 6 to the membrane 1.

It is possible to run the heat pipe system in a reverse sense using the heat exchanger as a thermostat with a higher temperature than the medium ambient temperature. In this case it is necessary to use a working fluid with a higher boiling point. Vaporization then takes place at the upper part of the heat pipe system and the lower part works as a condensator. This enables the transducer to operate at a high temperature level and thermal drift is largely precluded. This inverse operation of a heat pipe is advantageous when the engine is operated at greatly different thermal conditions and high accuracy of the pressure measurements is required. However, in general the first described operation mode (vaporizing section at the membrane side) at which the heat pipe system is transferring heat from membrane 1 to heat exchanger 8 would be advantageous.

By additional filling of the heat pipe system with a buffer gas (3-phase-operation) a displacement of the buffer gas into the upper part of the heat pipe takes place. When temperature is increasing in the heat pipe, vapor pressure is also increased, the buffer gas is further displaced and the transfer range to the cooled wick section (condensator section) is enlarged for the vapor. This amplification of the temperature dependence of the thermal conductivity enables a significantly improved temperature stabilizaton. To get a noticeable enlargement of the active condensator surface the connection of a reservoir 10' (FIG. 3) for the buffer gas is advantageous. The displaced buffer gas may evade into the reservoir 10' through the connecting bores 9.

Figure 2:
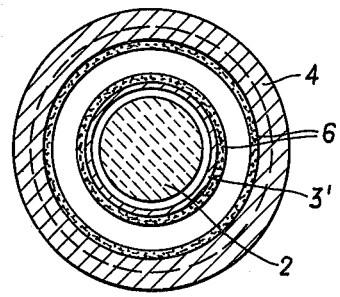
FIG. 2 is a section according to line II—II in FIG. 1.
Figure 5:
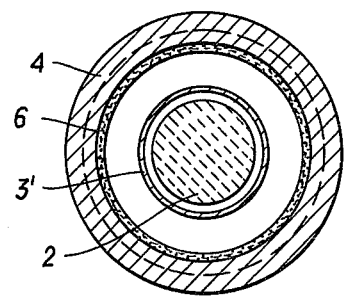
FIGS. 4 to 10 show further embodiments according to the representation in FIG. 2.
Figure 4:
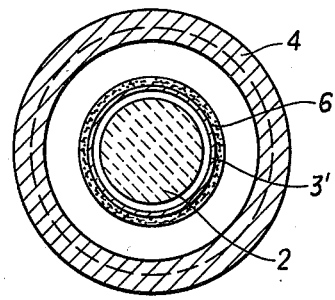

FIGS. 4 to 10 show several embodiments of a simple heat pipe system in section according to FIG. 2. In some cases the surrounding lining of the heat pipe volume with wick material is not necessary, as shown for instance in FIGS. 4 and 5, where only the outer and the inner cylinder surface is lined with wick material. As a matter of course the portion of the heat pipe adjacent to the membrane has to be in good thermal connection, therfore this part is preferably lined with wick material.

Figure 6:
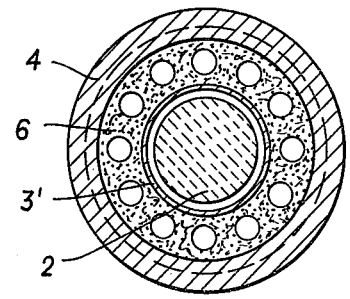
Figure 7:
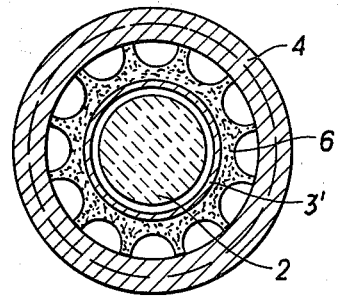
Figure 8:
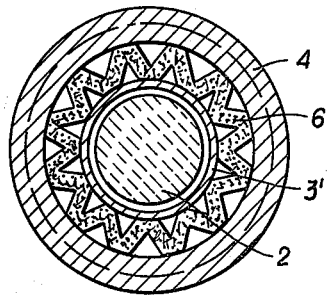
Figure 9:
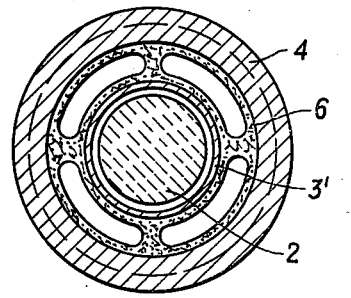
Figure 10:
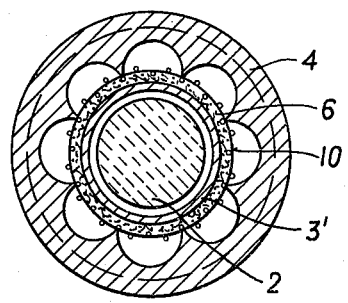

FIGS. 6, 7 and 9 show embodiments of heat pipe systems using porous shaped parts instead of wick material. FIG. 8 shows an example having a folded wick which alternatively touches the inner and the outer wall of the heat pipe and in between there is left sufficient space for the vapor flow. In the embodiment according to FIG. 10 the porous material is strengthened by a wire network 10 and the outer housing. This embodiment is especially advantageous for a transducer being exposed to strong vibrations wherein the crumbling of the wick material has to be prevented.

Figure 11:
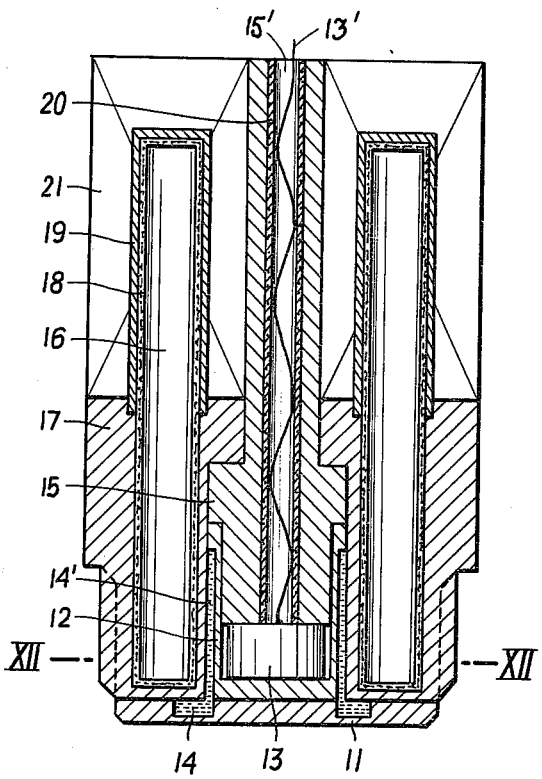
FIG. 11 is another embodiment in axial section, FIG. 12 a section according to line XII—XII in FIG. 11.
Figure 12:
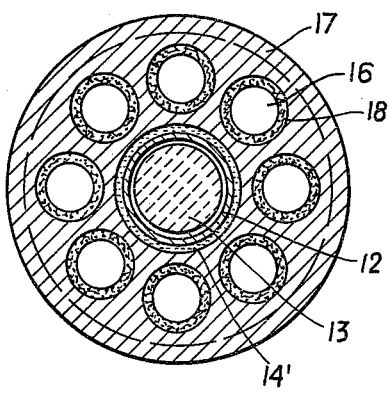

Another example for the installation of a heat pipe system in a transducer is shown in FIGS. 11 and 12. The sensor element 13 is enclosed by the biased spring 12 and the abutment 15. The electrical connection is symbolically indicated by wire 13' which is carried by guide bore 15' and insulated against the abutment 15 by an insulating layer 20. In contrast to the above mentioned embodiments the heat pipe is now placed in the housing 17 and the heat exchanger 21. It consists of a number of simple cylindrical heat pipes 16, the walls of which are lined completely with wick material. The partition 19 between the heat pipe and the heat exchanger may be of course already a part of the symbolic shown heat exchanger (or thermostat) 21. To gain efficient heat transfer from the membrane 11 to the housing and the heat pipes within the housing, the space 14 at the membrane 11 and its elongation 14' between the biased spring 12 and the housing 17 is filled with a fluid of good thermal conductivity. This embodiment has the advantage that pressure change in the heat pipe is not transmitted to the membrane. Additionally an escape of working fluid out of the heat pipe into the combustion chamber is avoided in the case of damage of the membrane. The heat pipe system remains fully operable even with a damaged membrane and more freedom with respect to the selection of the working fluid is obtained. Special care has to be given to the correct selection of the thermal conductive fluid in the spaces 14 and 14' concerning expansion coefficient, vapor pressure, thermal conductivity, and boiling point.

Figure 3:
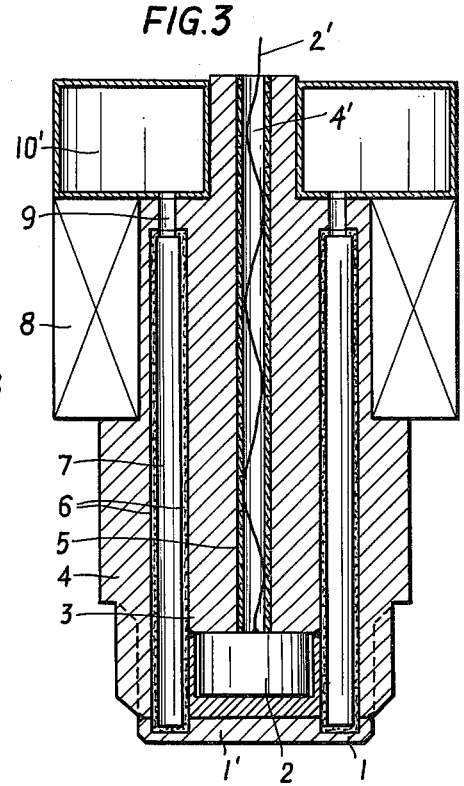
FIG. 3 snows another embodiment which is especially suitable for operation with additional buffer gas.

Of course also the above described heat pipe systems can be operated using a buffer gas and a gas reservoir for the 3-phase-operation, similar to that shown in FIG. 3.

Beside the herein described embodiments a large number of combinations and similar varients thereof exist.

In addition it is also possible to install several heat pipe systems with various operating temperatures and with various working fluids into a transducer. The simplest version of a two stage heat pipe system could be similar to the embodiment according to FIGS. 11 and 12 with the space 14 being an inner heat pipe which is operated at a higher temperature than the outer heat pipe system 16.

Figure 13:
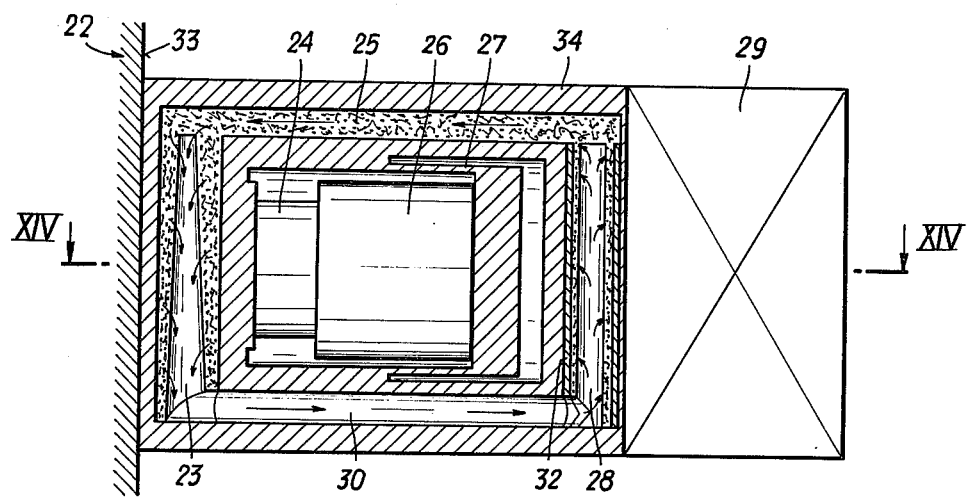
FIG. 13 shows an acceleration transducer in axial section.
Figure 14:
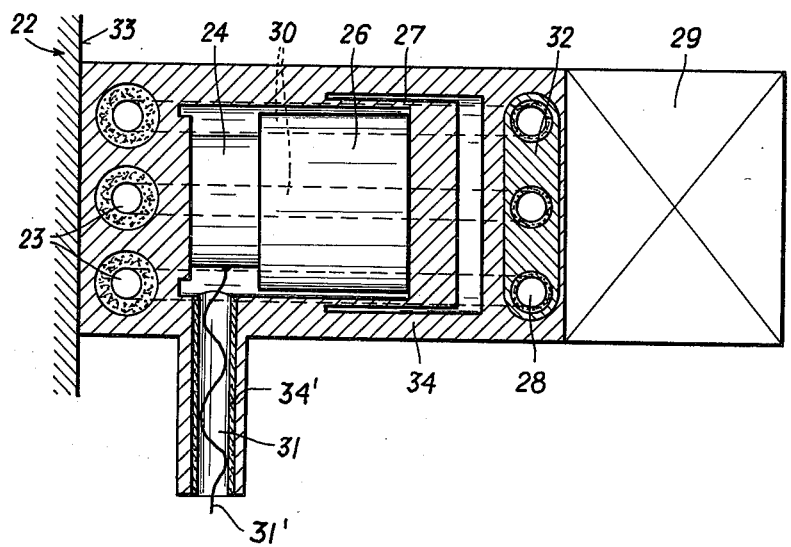
FIG. 14 a section according to line XIV—XIV in FIG. 13.

Finally, an example for an acceleration transducer with a heat pipe system according to the invention is described with the working fluid circulating around the sensor element. In the embodiment shown in FIGS. 13 and 14 the schematically designed sensor element 24 is pressed according to the acceleration of the seismic mass 26. The biasing spring is designated by the number 27 and the electrical connection by 31'. The guide bore 31 for the electric lead 31' is insulated against the housing 34 by an insulating layer 34'. For mounting the acceleration transducer on a strongly heated body 22 the housing of the transducer is equipped with a heat pipe system consisting of several (herein three) parallel circuits. The vapor flow goes from the vaporization section 23 through bore 30 to the condensation section 28. The condensation section is connected to a heat exchanger 29 by means of a copper block 32. Recycling of the working fluid occurs through the bore 25 which is filled with wick material. It can be seen that this embodiment enables good transmission of acceleration and also heat transfer from the body 11 over the mounting surface 33 to the sensor element 24 is avoided by the heat pipe system.

For the installation of the heat pipe system into the housing 34, the housing may be performed in two parts. A closer description thereof is not provided because it is not essential for the invention.

I claim

1. A transducer for measuring mechanical varibles having a housing and a heat pipe system arranged therein, said heat pipe system being heat-conductingly connected on one part thereof to the thermally stressed parts of the transducer, said heat pipe system comprising at least one self-contained closed receptacle, having walls at least partially lined with wick material to form a hollow space in said receptacle, a working fluid for wetting said wick material and being distributed by capillary action of the wick material, the working fluid circulating through the capillaries of the wick and the vapor of the working fluid circulating through said hollow space forming a closed loop, whereby heat transfer occurs by the convection of latent heat in the vapor phase of the fluid to improve the temperature balance within said hollow space.

2. A transducer according to claim 1, further comprising additional non-condensating gases at the working temperature of the system.

3. A transducer according to claim 1, further comprising a heat exchanger and the heat pipe system being heat-conductingly connected thereto.

4. A transducer according to claim 1, the heat pipe system is arranged within the transducer housing between the outer surface thereof and the transducer sensor element.

5. A transducer according to claim 1 wherein the transducer further comprises a clamping sleeve axially symmetrically surrounding and supporting the sensor element, the heat pipe system is arranged between the surface of the housing and the clamping sleeve, and heat transfer occurring in the direction of the axis of the clamping sleeve.

6. A transducer according to claim 5, wherein the space between the housing and the clamping sleeve forms a part of the heat pipe system, said heat pipe system further comprising a membrane and being terminated against the pressure side of said transducer by said membrane.

7. A transducer according to claim 1, further comprising a second heat pipe system being constructed as the first heat pipe system and being thermally conductively arranged between the sensor element and the first heat pipe system, said second heat pipe system operating at a higher temperature than said first heat pipe system.

8. A transducer according to claim 1, further comprising a second heat pipe system constructed as the first heat pipe system and being arranged parallel thereto and operating at a working temperature different than that of the first heat pipe system.

9. A transducer according to claim 1 further comprising an annular space, filled with a thermal conductive fluid, being formed between the pressure side end of the transducer and the heat pipe system.

10. A transducer according to claim 9, wherein said annular space is elongated in the axial direction of the transducer between the clamping sleeve and the heat pipe.

11. A transducer according to claim 1, said hollow space surrounding the sensor element is filled at least in part and at least partially with wick material, the working fluid circulating between the sensor element and the place of temperature attack.

12. A transducer according to claim 11, wherein the transducer is an acceleration transducer with the sensor element and the seismic mass being surrounded by a clamping sleeve, said heat pipe system surrounding the clamping sleeve, the heat pipe system including a vaporization section being arranged approximately perpendicular to the transducer longitudinal axis and between the sensor element and the mounting surface of the transducer and the heat pipe system further including a condensation section being arranged approximately parallel to the vaporization section at the other end of the transducer, both said vaporization and condensation sections being connected by two axially directed bores to form an annular duct.

13. A transducer according to claim 12 wherein the condensation section is arranged within a block of thermal conductive material.

* * * * *